Sept. 27, 1966         H. K. POHLMAN         3,275,729
METHOD OF MAKING ELASTOMERIC SEAL
Original Filed Sept. 24, 1962         2 Sheets-Sheet 1
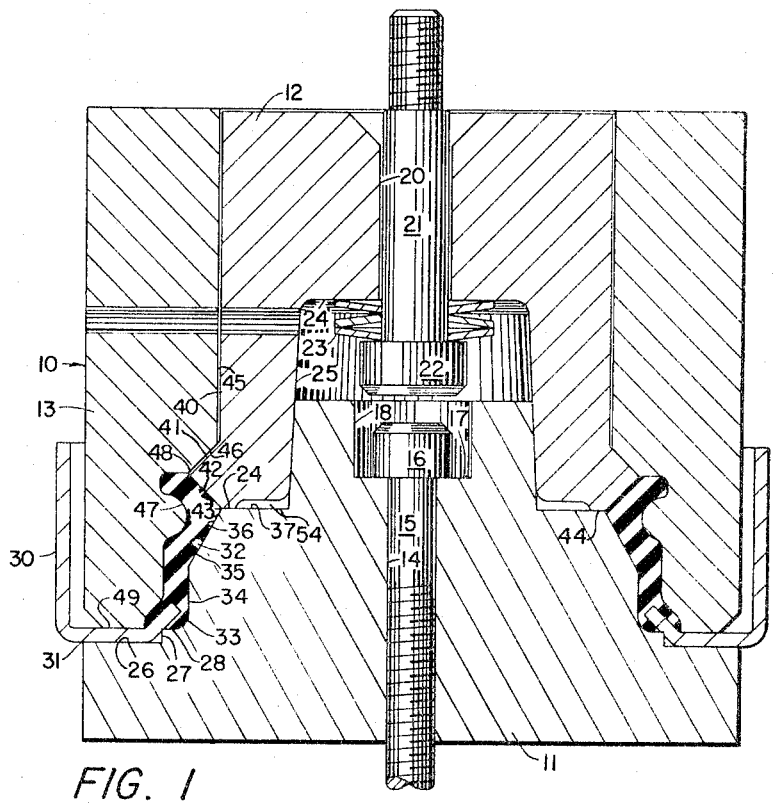
FIG. 1
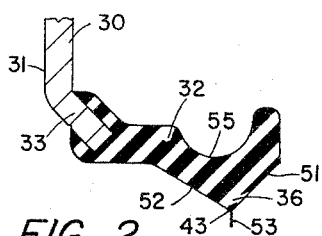
FIG. 2
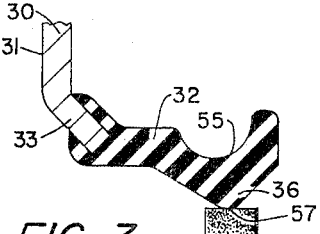
FIG. 3
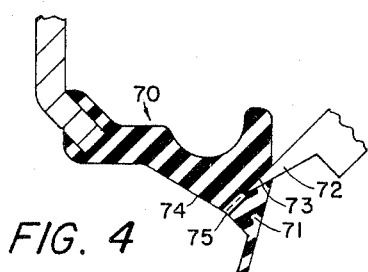
FIG. 4
(PRIOR ART)
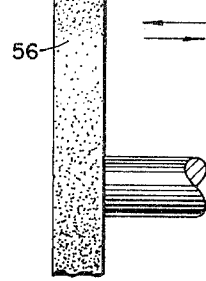
INVENTOR
H. K. POHLMAN
BY
ATTORNEYS

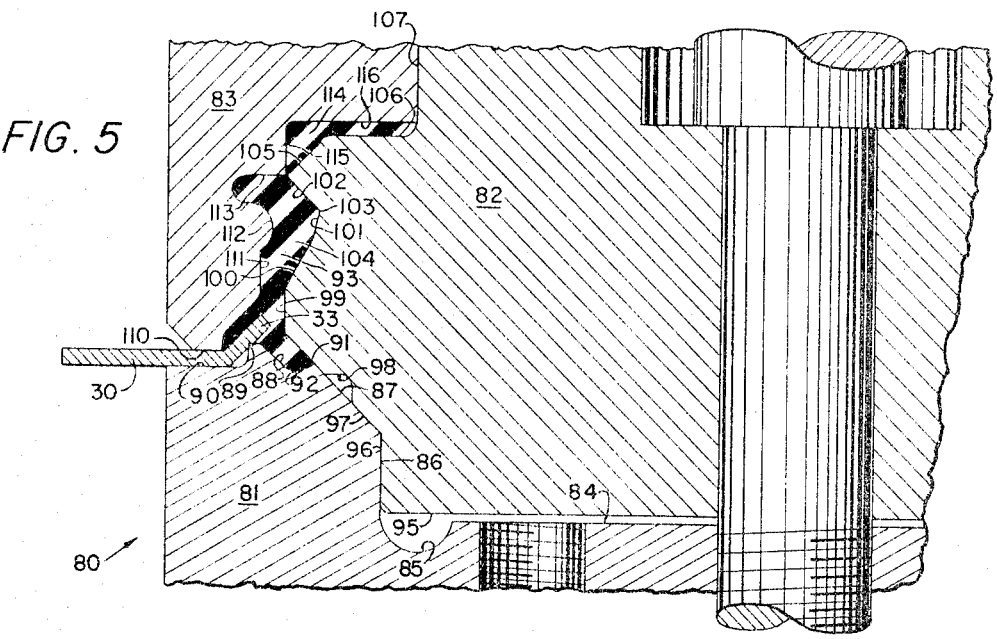
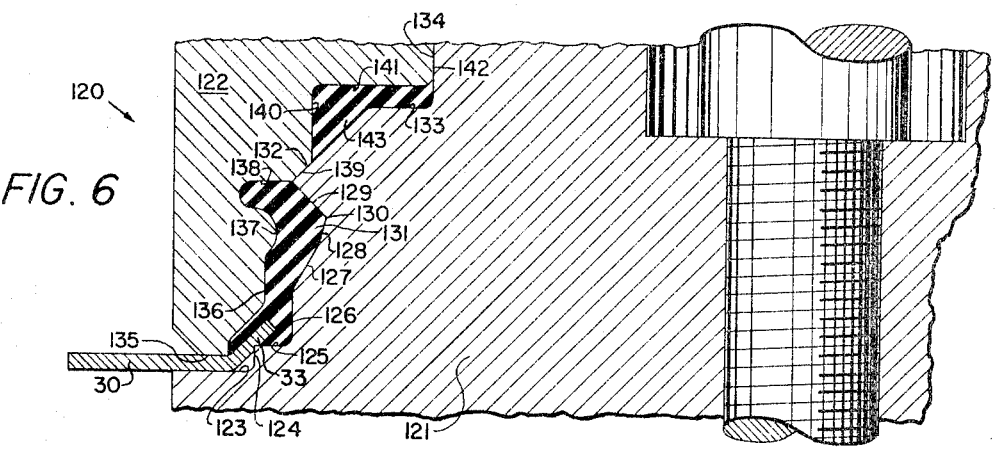

United States Patent Office 3,275,729
Patented Sept. 27, 1966

3,275,729
METHOD OF MAKING ELASTOMERIC SEAL
Henry Kingsley Pohlman, Atherton, Calif., assignor to Federal-Mogul Corporation, a corporation of Michigan
Original application Sept. 24, 1962, Ser. No. 225,586. Divided and this application Feb. 8, 1965, Ser. No. 440,978
6 Claims. (Cl. 264—162)

This application is a division of application Serial No. 225,586 filed September 24, 1962.

This invention relates to an improved method for making a shaft seal.

The lips of shaft seals molded from synthetic elastomers have heretofore been made by first molding them undersize on the inner periphery and then cuting off an inner peripheral portion of the as-molded unit by a sharp knife, rotating the annular seal past the knife. However, this has had some troublesome disadvantages. The lip receives inadequate support during this cut-trim, the support coming only from the elastomeric body and other molded-in elements of the seal itself, and although this commonly includes a metal case member, and even though the lip may be supported with a central button, still, the lip tends to flex during the cut-trim with resultant inaccuracies in the trim. Concentricity of trim relative to the remainder of the seal is a problem too, as is obtaining exact dimensions. The automotive industry, in particular, has been demanding closer tolerances, both for size and for lip pressure, and better concentricity; as those demands increase it becomes more and more difficult to meet them and thereby provide the required product quality, a good deal of the difficulty arising from the cut-trim process.

It has been proposed that shaft seals be molded exactly to size and to exact lip shape, but it has been difficult to obtain lips of the required sharpness. Moreover, even when, in experimental work, sharp lips have been achieved, the expected sealing ability was, surprisingly, absent. A possible explanation is that the elastomer (typically a butadiene-acrylonitrile copolymer, or a polysiloxane) has a skin on its as-molded surface that has different properties from the subcutaneous material such, perhaps, as less elasticity, that prevent it from sealing properly even when its shape is identical to that of a trimmed surface well able to seal. Whatever the cause, up to now such molded lips have not been satisfactory.

Better concentricity, more uniform sizes, more uniform lip pressures, better sealing action (i.e., a smaller percentage of "leakers"), and greater predictability of performance are objects of the invention and are achieved by a combination of an improved molding operation and an improved trimming operation. In particular, the lip is molded substantially to shape and is then carefully abraded to remove the skin and to impart the exact size and shape desired.

The invention enables the production of a seal having a limited contact lip of very small surface area so that unit pressure on the shaft can be varied to suit application requirements.

Different types of abrasive finishing means can be used, including grindstones, burrs, reamers or abrasive wheels carrying different sizes of grit particles, so that the surface of the ground portion can be tailored to suit different operating conditions. Moreover, the surface finish achieved by this abrasive finishing helps to provide passages which assure that a thin film of oil will be retained to lubricate the lip. Therefore, seals of this invention are less likely to run dry, get hot, wear away, burn away, slough, or crack because of failure to retain oil at the actual contact surface. The invention is particularly effective with seals made from elastomers that are liable to some swelling when exposed to hot oil.

Other objects and advantages of the invention will appear from the following description of some preferred embodiments of the invention.

In the drawings:

FIG. 1 is a view in elevation and in section of a mold embodying the principles of the invention for making the seal thereof.

FIG. 2 is an enlarged fragmentary view in elevation and in section of a portion of a seal embodying the principles of the invention after molding and before the abrasion-trim of this invention.

FIG. 3 is a view similar to FIG. 2 showing the seal after having its lip edge abraded to size.

FIG. 4 is a view similar to FIG. 2 showing how seals were trimmed in the prior art.

FIG. 5 is an enlarged fragmentary view in section and in elevation of a modified form of mold for use in the present invention.

FIG. 6 is a view similar to FIG. 5 of another modified form of mold for use in the invention.

The process covered by U.S. Patent 3,004,298 is particularly well suited to use in this invention, though not necessarily essential; so the seals shown are made by that process, as well as by the process of the present invention which applies particularly to the lip edge, whereas Patent 3,004,298 applies particularly to the anchorage of the lip to the case.

FIG. 1 illustrates a mold 10 having a lower mold element 11, an upper mold element 12, and a mold ring 13. The lower mold element 11 has a central opening 14 through which a capscrew 15 extends, the head 16 of the capscrew 15 resting on the bottom wall 17 of a recess 18 in the member 11; similarly, the upper mold element 12 has a central opening 20 through which a capscrew 21 extends, the head 22 of the capscrew 21 compressing a spring 23 (e.g., a Belleville washer) against the upper wall 24 of a recess 25 in the member 12.

The lower mold element 11 has an outer radial annular ledge 26 and circular step 27 joining the ledge 26 to a ledge 28. A metal case element 30 has a radial portion 31 that is initially placed on the inner ledge 28 and a resilient sealing element 32 is molded thereto at an annular portion 33 which is formed to a frusto-conical shape during molding. (The case element 30 could have an initially frusto-conical portion that is bent to a cylindrical shape during molding, if desired.) The ledge 28 ends at a radial portion 34 that leads to a frusto-conical portion 35 which is to form one face of a lip 36 of the sealing element 32. The portion 35 ends at a ledge 37.

The upper mold element 12 has a cylindrical portion 40, a frusto-conical portion 41, and a frusto-conical portion 42 that forms the other face of the lip 36, meeting the portion 35 of the lower mold member 11 at a sharp corner 43. At the corner 43, a flat portion 44 comes against the ledge 37.

The ring 13 has an upper cylindrical portion 45 encircling the portion 40, a frusto-conical portion 46 bearing against the frusto-conical portion 41, a mold cavity portion 47 meeting the portion 42 at a corner 48 where flashing is permissible, and a case-engaging portion 49 lying radially beyond the step 27.

During molding, the case portion 33 is reformed, and the elastomer fills the cavity defined by the mold faces 28, 35, 42 and 47, with possible flash at the parting lines where the members 37 and 44 meet and where the faces 41 and 46 meet, but as a matter of fact, substantially all the flashing occurs at the parting lines 37 and 43 where there is a cavity 54 closely adjacent to receive surplus elastomer.

A molded seal 50 is shown in FIG. 2. It has a lip 36 with faces 51 and 52, and may have a little flash 53 at the lip edge. It may or may not be intended to have a spring, the seal 50 being shown with a spring-receiving groove 55.

According to this invention, for the purposes previously described, this flash 53, if there is any, is removed, the lip 36 is exactly sized, and its skin, if any, at the sharp corner edge is removed abrasively, as by grinding, reaming, etc. As shown in FIG. 3, a suitable tool 56 mounted on a lathe (not shown) is reciprocated into and out from the seal 50 leaving the seal 50 with a slightly flattened lip edge 57 as shown in FIG. 3. Concentricity is assured in the lathe, and exact sizing is possible since only a very small amount of elastomer is removed. The abrading tool 56 is preferably slightly larger than the shaft on which the seal is to be installed, and the edge 57 is sized so as to exert the desired amount of pressure on that shaft when the seal is installed thereon.

FIG. 4 illustrates how lips were trimmed in the prior art. A seal 70 was molded with an undersize inner periphery, and a portion 71 was cut away by a knife 72 to provide a trimmed wall 73 that met a molded wall 74 to provide a lip 75. This prior art process was subject to all the objections already described.

FIG. 5 shows a modified forms of the present invention, employing a mold 80 in which there is a lower mold element 81, an upper mold element 82, and a mold ring 83. The lower mold element 81 in this instance has a central annular plateau portion 84, an annular recess 85, a cylindrical portion 86, a frusto-conical portion 87, a recessed portion 88, a projecting seat portion 89 which engages the metal case member 30 to form the terminal portion 33, and an outer annular portion 90 against which the major portion of the case 30 comes to rest when the mold 80 is closed. The frusto-conical portion 87 is adapted to be in line with one side 91 of an auxiliary lip 92 of a dual-lip elastomeric seal element, the lip 92 being defined partly by the portion 88.

The upper mold member 82 has an inner annular portion 95 that faces the portion 84, a cylindrical portion 96 opposite the portion 86, a frusto-conical portion 97 that mates with the frusto-conical portion 87 and also has a small flash receptacle 98, a short cylindrical portion 99 which will serve to divide the two lips of the seal, a reverse frusto-conical portion 100, a more nearly cylindrical frusto-conical portion 101 adjoining the portion 100, and a frusto-conical portion 102 meeting the portion 101 at a vertex 103 where the inner edge of the main lip 104 of the seal is actually molded. Note that the seal lip 104 has a two-step formation on one side due to the successive frusto-conical portion 100 and 101. This helps to limit the amount of material removed by abrasion, since the lip is already nearly cylindrical at the lip vertex. Another frusto-conical portion 105 leads to an annular portion 106 and a cylindrical portion 107.

The mold ring 83 has a lowermost short annular portion 110 which engages the case member 30 and forces the terminal portion 33 to take its frusto-conical shape in accordance with U.S. Patent 3,004,298. The mold ring 83 also has a recessed portion 111 adapted to form the radially outer portion of the sealing element, including a garter-spring groove 112, if desired, and terminating in an annular horizontal portion 113. A cavity 114 for excess elastomer is formed between the upper mold member 82 and the mold ring 83, the mold ring having a cylindrical portion 115 and an annular portion 116 at this location. Thus, the mold 80 parts at the auxiliary lip 92 and at a portion of the main lip 104 remote from the vertex 103. The flash that forms at the parting lines may be removed by knife, and the main lip 103 is then ground, just as described earlier.

This mold 80 has the advantage that there is no trimming of the main lip, since the rubber flows into the excess cavities which are distant from the main lip, and there is trimming only where the flash forms. The main lip 104 is abraded to the controlled size.

FIG. 6 shows another form of mold 120 generally like that of FIG. 5 except that it is used for molding a seal having only one lip, and therefore not requiring as complex a mold. The mold 120 has only two main parts; a lower mold member 121 and an upper mold member 122. The lower mold member 121 has an outer annular shelf 123 leading to a step 124 that is used in providing the terminal frusto-conical portion 33 of the case. A short annular portion 125 on the step leads to a cylindrical portion 126 followed by three successive frusto-conical portions 127, 128, and 129. The vertex 130 of the main lip 131 is molded in between portions 128 and 129, and the mold does not part at that point. The mold 120 parts at a line distant from the lip vertex 130, where the lower mold member provides another reverse frusto-conical portion 132 leading to an annular shelf 133 and a cylindrical portion 134.

The upper mold member 122 has a case-engaging short flat outer annular portion 135 followed by a recessed portion 136 for shaping the member to be molded, preferably providing a groove 137 for a spring and having an annular portion 138 which meets at the corner where the mold 120 parts. There is then a short mating frusto-conical portion 139, a cylindrical portion 140, an annular portion 141, and another cylindrical portion 142. The excess rubber flows into the excess cavity 143, which is joined to the mold cavity by the mold part line and is therefore again distant from the lip. When the seal is taken out of the mold, the flash is removed, and the lip vertex 130 is abraded to exact size and shape as shown in FIGS. 2 and 3.

To those skilled in the art to which this invention relates, many additional changes in construction and widely differing embodiments of the invention will suggest themselves without departing from the spirit and scope of the invention as defined in the claims.

What is claimed is:

1. A method of making a shaft seal comprising molding a lip from synthetic elastomer to provide a sharp lip edge bounded by oppositely inclined frusto-conical faces, and abrasively conditioning the sealing lip by grinding off said lip edge while said elastomer is in an elastic state, thereby improving the sealing performance of said shaft seal.

2. A method of making a shaft seal, comprising molding a lip from synthetic elastomer to provide a sharp lip edge bounded by oppositely inclined frusto-conical faces and having radial mold flash at said edge, and grinding off said flash and a minute amount of said lip edge to a predetermined size while said elastomer is in an elastic state, while providing there an abrasively conditioned oil-sealing lip.

3. A method of making a shaft seal from synthetic elastomer between molds meeting at a radial parting line to provide a sharp lip edge bounded by oppositely inclined frusto-conical faces, radial mold flash being permitted at said parting line, and providing an abrasively conditioned oil sealing surface by grinding off said flash and a small skin portion of said lip edge while said elastomer is in an elastic state.

4. A method of making a shaft seal, comprising molding an annular lip from synthetic elastomer to provide a sharp lip edge bounded by oppositely inclined frusto-conical faces and abrasively conditioning said lip by grinding said lip edge to a predetermined diameter while said elastomer is in an elastic state, so as to provide oil-sealing properties superior to those of an as-molded lip edge.

5. A method of making a shaft seal, comprising molding an annular lip from synthetic elastomer between molds meeting at a parting line spaced from said lip to provide a sharp lip edge bounded by oppositely inclined frusto-conical faces, removing the flash from the parting-line portion, and abrasively conditioning said lip by grinding off a small portion of said lip edge while said elastomer is in an elastic state to provide a roughened short cylindrical portion there.

6. A method of making a shaft seal from elastomer liable to some swelling in hot oil, comprising molding an annular lip from said elastomer to provide a lip bounded by two oppositely inclined frusto-conical faces that are joined by a third more nearly cylindrical frusto-conical face, and improving the sealing performance of the as-molded lip by abrasive conditioning by grinding off said lip edge while said elastomer is in an elastic state to a shape providing a short generally cylindrical portion along a substantial portion of said third face.

References Cited by the Examiner

UNITED STATES PATENTS

| | | | |
|---|---|---|---|
| 1,195,204 | 8/1916 | Gleason | 264—162 |
| 2,976,573 | 3/1961 | Davis | 264—162 |
| 3,041,674 | 7/1962 | Spencer et al. | 264—162 |
| 3,199,191 | 8/1965 | Dega | 264—162 |

ROBERT F. WHITE, *Primary Examiner.*

S. A. HELLER, *Assistant Examiner.*